United States Patent
Ota et al.

(10) Patent No.: US 9,524,574 B2
(45) Date of Patent: Dec. 20, 2016

(54) DATA PROCESSING APPARATUS, DISPLAY APPARATUS, AND METHOD OF CONTROLLING THE DATA PROCESSING APPARATUS

(71) Applicant: Seiko Epson Corporation, Tokyo (JP)

(72) Inventors: Koichiro Ota, Oomachi (JP); Kazuyoshi Kitabayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 206 days.

(21) Appl. No.: 13/900,119

(22) Filed: May 22, 2013

(65) Prior Publication Data

US 2013/0314439 A1 Nov. 28, 2013

(30) Foreign Application Priority Data

May 25, 2012 (JP) .................. 2012-119427
May 25, 2012 (JP) .................. 2012-119428

(51) Int. Cl.
| | |
|---|---|
| G09G 5/00 | (2006.01) |
| G06T 11/60 | (2006.01) |
| G06F 3/0488 | (2013.01) |
| G06F 3/14 | (2006.01) |
| G06F 3/041 | (2006.01) |

(52) U.S. Cl.
CPC ............ *G06T 11/60* (2013.01); *G06F 3/0416* (2013.01); *G06F 3/0488* (2013.01); *G06F 3/14* (2013.01); *G06F 3/1454* (2013.01); *G09G 2340/12* (2013.01)

(58) Field of Classification Search
CPC ......... G06T 11/60; G06T 15/503; G09G 5/14; G09G 2340/10; G09G 2340/125
USPC ........................................... 345/629
See application file for complete search history.

(56) References Cited

U.S. PATENT DOCUMENTS

| | | | | |
|---|---|---|---|---|
| 6,792,398 | B1 * | 9/2004 | Handley | ............... G06F 3/016 345/419 |
| RE39,040 | E * | 3/2006 | Ogawa | ............... G02B 3/0056 353/101 |
| 2009/0304582 | A1* | 12/2009 | Rousso | ............. A61B 5/02755 424/1.61 |
| 2012/0062591 | A1 | 3/2012 | Omura et al. | |

(Continued)

FOREIGN PATENT DOCUMENTS

| | | |
|---|---|---|
| JP | 8-55231 A | 2/1996 |
| JP | 2006-31359 A | 2/2006 |

(Continued)

*Primary Examiner* — Ke Xiao
*Assistant Examiner* — Gordon Liu
(74) *Attorney, Agent, or Firm* — ALG Intellectual Property, LLC

(57) ABSTRACT

A projector includes a coordinate acquiring unit configured to acquire a coordinate of a position pointed by a pointer, a sub-processor configured to render an image on the basis of the coordinate, and a main processor configured to output image data of the image rendered by the sub-processor. The projector performs, according to a predetermined condition, using the main processor, rendering in the same manner as the sub-processor on the basis of the acquired input coordinate, superimposes the rendered image on the rendered image output by the sub-processor to generate a superimposed image, and outputs the superimposed image.

14 Claims, 8 Drawing Sheets

(56) References Cited

U.S. PATENT DOCUMENTS

2014/0129990 A1* 5/2014 Xin .................. G06K 9/6201
                                                  715/849
2015/0212728 A1   7/2015 Omura et al.

FOREIGN PATENT DOCUMENTS

| JP | 2006-145643 A | 6/2006 |
| JP | 2011-28629 A  | 2/2011 |
| JP | 2011-126225 A | 6/2011 |
| JP | 2012-84122 A  | 4/2012 |

* cited by examiner

| OPERATION MODE | FUNCTION TO BE EXECUTED | POINTER |
|---|---|---|
| RENDERING MODE | RENDERING | NONE |
| PC OPERATION MODE | FUNCTION OF POINTING DEVICE | ARROW |

FIG. 3

DATA PROCESSING APPARATUS, DISPLAY APPARATUS, AND METHOD OF CONTROLLING THE DATA PROCESSING APPARATUS

The entire disclosure of Japanese Patent Application Nos. 2012-119427, filed May 25, 2012 and 2012-119428, filed May 25, 2012 are expressly incorporated by reference herein.

BACKGROUND

1. Technical Field

The present invention relates to a data processing apparatus that processes image data, a display apparatus, and a method of controlling the data processing apparatus.

2. Related Art

There has been known a system including a display apparatus such as a projector and configured to detect, when a user performs position input operation using a device such as an electronic pen, a pointed position and perform rendering or the like (see, for example, JP-A-2011-028629 (Patent Literature 1)). In the system described in Patent Literature 1, the display apparatus detects a position pointed by a pointer and a computer connected to the display apparatus generates a rendered video on the basis of the detected pointed position. The display apparatus is configured to display the rendered video generated by the computer.

In a system that performs rendering on the basis of a pointed position of position input operation such as the system described in Patent Literature 1, there is a concern that, when time from operation by a user until display of an image increases, the user feels a sense of discomfort and feeling of operation is deteriorated.

In recent years, a mode for connecting a computer and peripheral equipment by radio communication is spread. However, when the radio communication is applied to the system, it is likely that the time until the display of a rendered image further increases because of a transmission delay. Therefore, there is a demand for a technique of making it possible to display a rendered image within a short time after a user performs operation.

SUMMARY

An advantage of some aspect of the invention is to provide a display apparatus, a display control method, a display system, a data processing apparatus, and a method of controlling the data processing apparatus that can reduce time from operation by a user until display of an image rendered on the basis of a pointed position by the operation by the user.

An aspect of the invention is directed to a data processing apparatus that outputs image data, the data processing apparatus including: a coordinate acquiring unit configured to acquire an input coordinate; a rendering unit configured to render an image on the basis of the input coordinate acquired by the coordinate acquiring unit; and an output unit configured to output image data of the image rendered by the rendering unit. The output unit is configured to be capable of executing superimposition processing for performing rendering in the same manner as the rendering unit on the basis of the input coordinate acquired by the coordinate acquiring unit, superimposing the rendered image on the image output by the rendering unit to generate superimposed image data, and outputting the superimposed image data and executes the superimposition processing on the basis of a predetermined condition.

According to the aspect of the invention, when one of the rendering unit configured to perform rendering and the output unit configured to output image data performs the rendering, data of the image rendered on the basis of the input coordinate is output. Therefore, it is possible to reduce time until the output of the data of the rendered image to match higher one of processing speeds of the rendering unit and the output unit. Consequently, for example, when an image is displayed on the basis of the image data output by the data processing apparatus, it is possible to reduce time until display of the rendered image.

In the aspect of the invention, the coordinate acquiring unit and the output unit may be configured by a first processing device, and the rendering unit may be configured by a second processing device provided independently from the first processing device.

According to this configuration, it is possible to reduce time until the display of the rendered image using an ability of any one processing device having higher processing speed among a plurality of processing devices. Even when time is consumed in a process for inputting the input coordinate to the second processing device and a process for outputting an image from the second processing device to the first processing device, data of an image rendered by the first processing device is output earlier. Therefore, a delay until the display of the rendered image does not occur. It is possible to quickly output the image data.

In the aspect of the invention, the output unit may execute the superimposition processing for a predetermined time after the acquisition of the input coordinate by the coordinate acquiring unit and thereafter output the image data without superimposing another image on the image rendered by the rendering unit.

According to this configuration, after the predetermined time elapses and the image rendered by the rendering unit is input to the output unit, an un-superimposed image is output. Therefore, even if an image is made unclear by the superimposition processing, since the image is quickly switched to a clear image, it is possible to prevent deterioration in image quality. Further, it is possible to appropriately determine timing for ending the superimposition processing.

In the aspect of the invention, the output unit may execute the superimposition processing after the acquisition of the input coordinate by the coordinate acquiring unit and stop the superimposition processing when detecting that an image same as the image rendered by the output unit is included in the image rendered by the rendering unit.

According to this configuration, an un-superimposed image is output after it is detected that the image rendered by the rendering unit is input to the output unit. Therefore, even if an image is made unclear by the superimposition processing, since the image is quickly switched to a clear image, it is possible to prevent deterioration in image quality. Further, it is possible to appropriately determine timing for ending the superimposition processing.

In the aspect of the invention, the data processing apparatus may display an image on the basis of image data input from an image output apparatus, and the data processing apparatus may further include: a display unit configured to display an image; an input detecting unit configured to detect position input operation to calculate an input coordinate and output the input coordinate to the image output apparatus; a rendering unit configured to perform rendering processing for generating an image on the basis of the input coordinate calculated by the input detecting unit; and a display control unit configured to superimpose the image generated by the rendering unit on the image based on the image data input from the image output apparatus and cause the display unit to display the image.

According to this configuration, it is possible to cause the image output apparatus, which inputs an image to the display apparatus, to perform rendering of the image based on the input coordinate on the basis of the coordinate input by the position input operation. Before the image data including the image rendered by the image output apparatus is input, the image generated by the display apparatus is displayed. Therefore, even in a period until the image rendered by the image output apparatus is displayed after the position input operation is detected, it is possible to display the image rendered according to the position input operation. Consequently, even when a delay occurs in timing when the image data is input to the display apparatus from the image output apparatus, it is possible to display the image without delay.

In the aspect of the invention, the display control unit may stop, according to a predetermined condition, the superimposed display of the image generated by the rendering unit.

According to this configuration, when the superimposed display of the image generated by the display apparatus is unnecessary, for example, when the image data of the image rendered by the image output apparatus on the basis of the input coordinate is input, it is possible to stop the superimposed display. Consequently, it is possible to display the rendered image without hindering the display of the input image from the image output apparatus and while quickly responding to an input of a coordinate.

In the aspect of the invention, the display control unit may stop the superimposed display when a predetermined time elapses after the superimposed display of the image generated by the rendering unit is started.

According to this configuration, it is possible to superimpose and display the image generated by the display apparatus, for example, only in a period until the image data of the image rendered by the image output apparatus on the basis of the input coordinate is input. Therefore, it is possible to display the rendered image without hindering the display of the input image from the image output apparatus and while quickly responding to an input of a coordinate.

In the aspect of the invention, the display control unit may stop the superimposed display when the image data input from the image output apparatus is image data including an image rendered on the basis of the input coordinate calculated by the input detecting unit.

According to this configuration, the superimposed display is stopped when the image rendered by the image output apparatus on the basis of the input coordinate is included in the image data input from the image output apparatus. Therefore, the image generated by the display apparatus is superimposed-displayed, for example, only in a period until the image rendered by the image output apparatus on the basis of the input coordinate is input. Therefore, since the image rendered by the display apparatus is displayed until the image rendered by the image output apparatus is displayed only when necessary, it is possible to prevent, for example, deterioration in operability due to an unnecessary operation. Even when an image rendered by the display apparatus and an image rendered by the image output apparatus on the basis of the same input coordinate are different, it is possible to compensate for a delay in an input of an image without causing a sense of discomfort.

In the aspect of the invention, the display unit may include a light source, a modulating unit configured to modulate light emitted by the light source, and a projecting unit configured to project the light modulated by the modulating unit on a projection surface. The input detecting unit may detect position input operation on the projection surface.

According to this configuration, the display apparatus including the projecting unit configured to project an image displays the image rendered according to the input coordinate. Therefore, even when a delay occurs in the input of the image data from the image output apparatus, it is possible to quickly display an image. For example, even when an image rendered by the display apparatus and an image rendered by the image output apparatus on the basis of the same input coordinate are different, a sense of discomfort is not caused.

Another aspect of the invention is directed to a display apparatus including: a display unit configured to display an image; an input detecting unit configured to detect position input operation to acquire an input coordinate; a rendering unit configured to render an image on the basis of the input coordinate acquired by the input detecting unit; an output unit configured to output image data of the image rendered by the rendering unit; and a display control unit configured to cause the display unit to display the image on the basis of the image data output by the output unit. The output unit is configured to be capable of executing superimposition processing for performing rendering in the same manner as the rendering unit on the basis of the input coordinate acquired by the input detecting unit, superimposing the rendered image on the image output by the rendering unit to generate superimposed image data, and outputting the superimposed image data and executes the superimposition processing on the basis of a predetermined condition.

According to this aspect of the invention, when one of the rendering unit configured to perform rendering and the output unit configured to output image data performs the rendering, the image rendered on the basis of the input coordinate is displayed. Therefore, it is possible to reduce time until the display of the rendered image to match higher processing speed of processing speeds of the rendering unit and the output unit.

Still another aspect of the invention is directed to a method of controlling a data processing apparatus including a main processor and a sub-processor, the main processor including a coordinate acquiring unit configured to acquire an input coordinate and an output unit configured to output image data of an image rendered by the sub-processor, and the sub-processor including a rendering unit configured to render an image on the basis of the input coordinate acquired by the coordinate acquiring unit. The method includes causing, according to a predetermined condition, the main processor to execute superimposition processing for performing rendering in the same manner as the rendering unit on the basis of the input coordinate acquired by the coordinate acquiring unit, superimposing the rendered image on the image output by the rendering unit to generate superimposed image data, and outputting the superimposed image data.

According to this aspect of the invention, when one of the main processor and the sub-processor performs rendering, data of an image rendered on the basis of the input coordinate is output. Therefore, it is possible to reduce time until the output of data of the rendered image to match higher one of processing speeds of the main processor and sub-processor. Furthermore, even when time is consumed in a process for transmitting the input coordinate and the rendered image between the main processor and the sub-processor, data of image rendered by the main processor is output earlier. Therefore, a delay until the display of the rendered image does not occur. It is possible to quickly output the data of the rendered image.

According to the aspects of the invention, it is possible to display the image rendered according to the position input operation.

BRIEF DESCRIPTION OF THE DRAWINGS

The invention will be described with reference to the accompanying drawings, wherein like numbers reference like elements.

FIG. 3 is an explanatory diagram showing an example of operation modes of a PC.

FIGS. 4A and 4B are flowcharts for explaining the operation of the projection system, wherein FIG. 4A is a flowchart for explaining the operation of the PC and FIG. 4B is a flowchart for explaining the operation of a projector.

DESCRIPTION OF EXEMPLARY EMBODIMENTS

Figure 1:
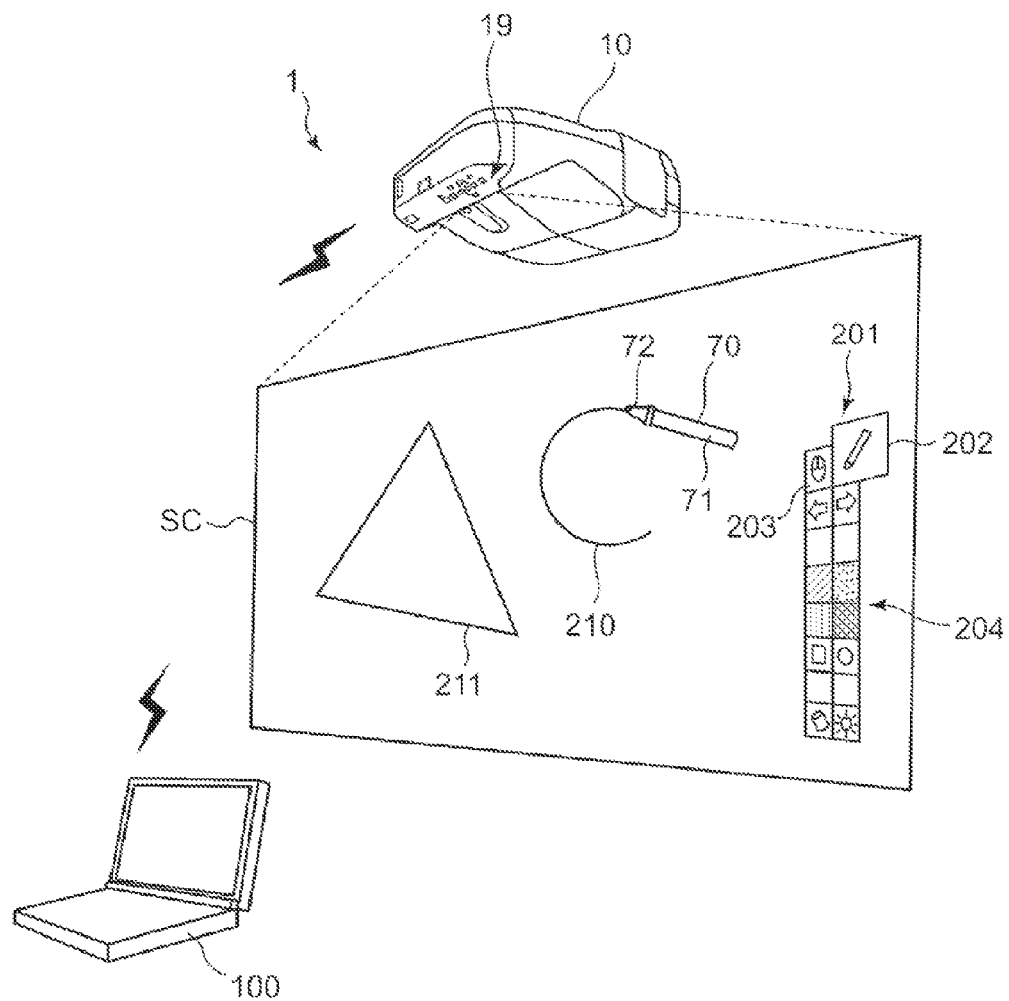
FIG. 1 is a diagram of the configuration of a projection system according to a first embodiment.

Embodiments to which the invention is applied are explained below with reference to the drawings.
First Embodiment FIG. 1 is a diagram showing the configuration of a projection system 1 (a display system) according to an embodiment to which the invention is applied. The projection system 1 is configured by connecting a PC (personal computer) 100 to a projector 10 set above a screen SC.

The projector 10 (a display apparatus) receives image data transmitted from the PC 100 (an image output apparatus) and projects an image based on the image data on the screen SC functioning as a projection surface. The PC 100 is an external apparatus independent from the projector 10. The PC 100 transmits the image data to the projector 10. The projector 10 is a short focus type and is set right above the screen SC. The projector 10 projects the image obliquely downward.

The projector 10 not only projects the image based on the image data transmitted from the PC 100 but also projects, on the screen SC, an image based on image data stored in the inside of the projector 10 and an image generated as explained below in the inside of the projector 10.

The projector 10 can project the image data received from the PC 100 irrespective of whether the image data is still image data or moving image (video) data. The screen SC is not limited to a flat plate fixed to a wall surface. The wall surface itself can also be used as the screen SC.

In the projection system 1, a user can perform operation using a pointer 70 on the screen SC on which the projector 10 projects the image. The pointer 70 is, for example, a pen-type device. The user uses the pointer 70 holding a shaft section 71 by hand and pressing a tip of the pointer 70 against the screen SC. An operation switch 72 for detecting pressing operation is provided at the tip of the pointer 70. When the user presses the tip of the pointer 70 against the screen SC, the operation switch 72 is turned on. The user presses the tip of the pointer 70 against the screen SC in an arbitrary position on the screen SC to perform position input operation.

As explained below, the projector 10 has a function of detecting the position of the pointer 70 on the screen SC. When the user performs the position input operation, a position where the tip of the pointer 70 touches the screen SC is detected as a pointed position.

The projection system 1 functions as an interactive whiteboard system that receives the position input operation performed by the user with the pointer 70 and reflects the operation on a projected image. Specifically, when the user performs the position input operation using the pointer 70, the projection system 1 detects the position input operation and calculates a coordinate of the pointed position. The projection system 1 renders a figure such as a straight line, a curved line, or a polygon according to the calculated coordinate of the pointed position and projects the rendered figure on the screen SC. In a state in which some image is projected on the screen SC, the projection system 1 can render an image to overlap the projected image. The projection system 1 can start rendering of an image after shifting to a state in which no image is projected. The image rendered by this function can be stored as image data. Only the rendered image can be stored as image data or can be stored as one image data together with the projected image projected on the screen SC during the rendering.

In the projection system 1, the projector 10 performs processing for detecting the position input operation by the pointer 70 and calculating the coordinate of the pointed position. The projector 10 transmits operation data including the coordinate of the pointed position to the PC 100. The PC 100 receives the operation data from the projector 10, executes rendering processing for generating an image based on the coordinate included in the operation data, and generates image data for display on the basis of the generated image. The image data for display may be image data representing the image itself generated by the rendering processing or may be image data obtained by superimposing the image generated by the rendering processing on another image. The PC 100 outputs the generated image data for display to the projector 10. Consequently, the image rendered according to the operation of the pointer 70 is projected on the screen SC like, for example, rendered images 210 and 211.

A toolbar 201 is projected on the screen SC. On the toolbar 201, a plurality of function buttons 204 and the like for causing the projector 10 to execute various functions are arranged. When a position overlapping any one of the function buttons 204 is pointed by the operation of the pointer 70, the projector 10 executes a function allocated to the function button 204 corresponding to the pointed position. The toolbar 201 is included in the projected image based on the image data output by the PC 100. The PC 100 determines whether the pointed position by the pointer 70 overlaps a display position of each of the buttons of the toolbar 201 and, when the pointed position overlaps the display position, the PC 100 executes a function of the button corresponding to the pointed position.

On the toolbar 201, for example, a rendering mode switching button 202 and a PC operation mode switching button 203 are arranged. The rendering mode switching button 202 is a button for switching an operation mode of the PC 100 to an operation mode for performing rendering according to the operation of the pointer 70 (a rendering mode). On the other hand, the PC operation mode switching button 203 is a button for switching the operation mode of the PC 100 to an operation mode for using the pointer 70 as a pointing device of the PC 100 (a PC operation mode).

In the PC operation mode, the pointer 70 functions as a pointing device such as a mouse or a digitizer. For example, according to the operation of the pointer 70, data operation such as selection, editing, deletion, movement, and copy of data stored by the PC 100 and an execution instruction for an application program of the PC 100 can be performed.

Figure 2:
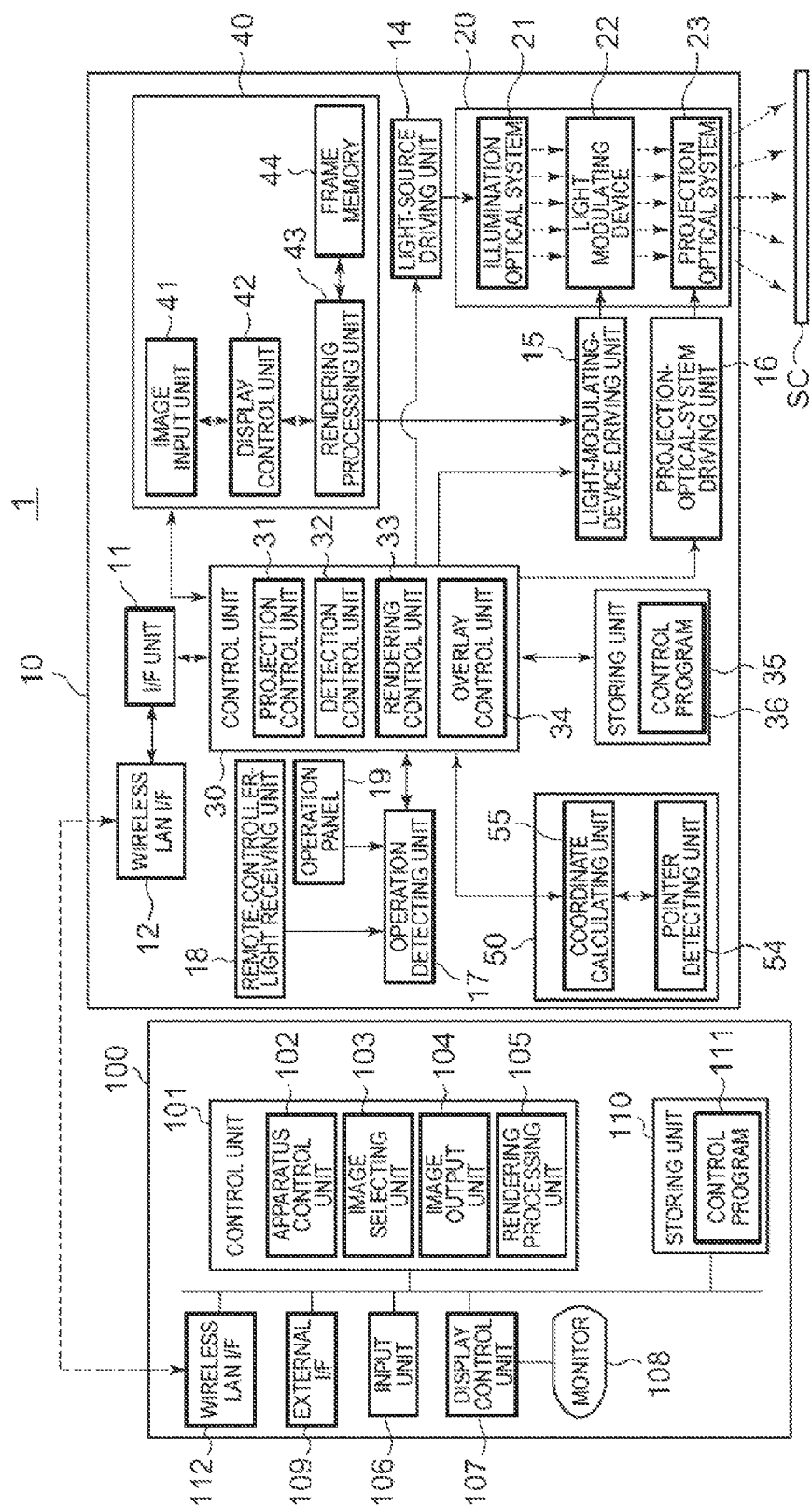
FIG. 2 is a functional block diagram of units included in the projection system.

FIG. 2 is a functional block diagram of the units included in the projection system 1.

The projector 10 includes an I/F (interface) unit 11 connected to image output apparatuses such as the PC 100, a video reproducing apparatus, and a DVD reproducing apparatus. The I/F unit 11 includes, for example, a wired or wireless USB interface, a wired or wireless LAN interface, a VGA terminal to which an analog video signal is input, a DVI (Digital Visual Interface) terminal to which digital image data is input, an S video terminal to which composite video signals such as NTSC, PAL, and SECAM are input, an RCA terminal to which a composite video signal is input, a D terminal to which a component video signal is input, and an HDMI connector conforming to an HDMI (registered trademark) standard. A wireless LAN interface 12 for performing radio communication with the PC 100 is connected to the I/F unit 11. The wireless LAN interface 12 executes a protocol conforming to the IEEE 802.11 standard and transmits and receives various data between the wireless LAN interface and a wireless LAN interface 112 explained below. Consequently, the projector 10 and the PC 100 are connected to be capable of transmitting and receiving data each other.

The projector 10 roughly includes a projecting unit (a display unit) configured to perform formation of an optical image and an image processing system configured to process image data. The projecting unit 20 includes an illumination optical system 21, a light modulating device 22, and a projection optical system 23. The illumination optical system 21 includes a light source configured by a Xenon lamp, an extra-high pressure mercury lamp, an LED (Light Emitting Diode), or a laser light source. The illumination optical system 21 may include a reflector and an auxiliary reflector configured to guide light emitted by the light source to the light modulating device 22 or may include a lens group (not shown in the figure) or a sheet polarizer for improving an optical characteristic of projected light or a dimming element for reducing a light amount of the light emitted by the light source on a path leading to the light modulating device 22.

The light modulating device 22 (a modulating unit) includes, for example, three transmissive liquid crystal panels corresponding to the three primary colors of RGB and modulates light transmitted through the liquid crystal panels to generate image light. The light from the illumination optical system 21 is separated into color lights of the three colors of RGB. The color lights are made incident on the liquid crystal panels corresponding thereto. The color lights transmitted through the liquid crystal panels to be modulated are combined by a combination optical system such as a cross-dichroic prism and emitted to the projection optical system 23.

The projection optical system 23 (a projecting unit) includes a zoom lens for performing enlargement and reduction of an image to be projected and adjustment of a focus, a motor for zoom adjustment for adjusting a degree of zoom, a motor for focus adjustment for performing adjustment of a focus, and a concave mirror configured to reflect projected light toward the screen SC. The projection optical system 23 performs zoom adjustment and focus adjustment for image light modulated by the light modulating device 22, guides the light passed through the lens group in the screen SC direction using the concave mirror, and focuses the light on the screen SC. A projection-optical-system driving unit 16 configured to drive the motors included in the projection optical system 23 according to the control by a control unit 30 and a light-source driving unit 14 configured to drive the light source included in the illumination optical system 21 according to the control by the control unit 30 are connected to the projecting unit 20. A specific configuration of the projection optical system 23 is not limited to the example explained above. For example, in a configuration in which the mirror including the concave mirror is not used, it is also possible to project the light modulated by the light modulating device 22 on the screen SC using a lens and focus the light.

On the other hand, the image processing system mainly includes the control unit 30 configured to integrally control the entire projector 10. The image processing system includes a storing unit 35 configured to store a control program 36 executed by the control unit 30 and data processed by the control unit 30, an operation detecting unit 17 configured to detect operation performed via an operation panel 19 and a remote-controller-light receiving unit 18, an image processing unit 40 configured to process an input image input via the I/F unit 11, and a light-modulating-device driving unit 15 configured to drive the light modulating device 22 and perform rendering on the basis of an image signal processed by the image processing unit 40.

The operation detecting unit 17 is connected to the remote-controller-light receiving unit 18 and the operation panel 19.

The remote-controller-light receiving unit 18 receives an infrared signal transmitted by a remote controller (not shown in the figure) used by the user of the projector according to button operation. The remote-controller-light receiving unit 18 decodes the infrared signal received from the remote controller, generates operation data indicating operation content in the remote controller, and outputs the operation data to the control unit 30.

The operation panel 19 is provided in an armor housing of the projector 10 and includes various switches and an indicator lamp. The operation detecting unit 17 is controlled by the control unit 30 to turn on or turn on and off the indicator lamp of the operation panel 19 as appropriate according to an operation state or a setting state of the projector 10. When a switch of the operation panel 19 is operated, operation data corresponding to the operated switch is output from the operation detecting unit 17 to the control unit 30.

The control unit 30 outputs image data input from the I/F unit 11 to the image processing unit 40. The image processing unit 40 includes an image input unit 41 configured to buffer input image data, a display control unit 42 configured to execute various kinds of conversion processing such as interlace/progressive conversion, resolution conversion, and color conversion on the image data as appropriate and generate image data of a format set in advance, and a rendering processing unit 43 configured to expand an image for each frame in a frame memory 44 on the basis of the image data processed by the display control unit 42. The image processing unit 40 outputs the image data expanded in the frame memory 44 to the light-modulating-device driving unit 15.

The rendering processing unit 43 executes overlay rendering for rendering, in the frame memory 44, an image based on image data input from the PC 100 and rendering an image based on image data generated by a rendering control unit 33 explained below to be superimposed on the image.

The pointer 70 includes a transmission circuit (not shown in the figure) configured to output an infrared signal from a transmission window (not shown in the figure) provided in a shaft section 71. The transmission circuit includes a light emitting section such as an infrared LED, a light emission control circuit, and a power supply. In a state in which the power supply of the pointer 70 is on, the transmission circuit cyclically transmits the infrared signal according to a system conforming to, for example, an IrDA standard. The transmission circuit modulates the infrared signal according to an output state of an operation state (ON/OFF) of the operation switch 72.

The projector 10 includes a position-input detecting unit 50 configured to receive the infrared signal transmitted by the pointer 70 and detect the position of the pointer 70 and an operation state of the operation switch 72. The position-input detecting unit 50 includes a pointer detecting unit 54 and a coordinate calculating unit 55 and functions as an operation detecting unit.

The pointer detecting unit 54 includes, for example, an image pickup unit (not shown in the figure) arranged to face the same direction as the projection optical system 23 and having an angle of view that covers a range in which the projection optical system 23 projects an image on the screen SC. The image pickup unit includes a light-receiving element configured by a CCD or a CMOS that receives infrared light and an interface circuit configured to read out and output a detection value of the light-receiving element. The pointer detecting unit 54 executes photographing using the image pickup unit and detects the position of the pointer 70 on the basis of photographed image data. The pointer detecting unit 54 demodulates the received infrared signal to thereby detect the operation state of the operation switch 72. The coordinate calculating unit 55 calculates, on the basis of the position of the pointer 70 detected by the pointer detecting unit 54, a position coordinate of the operation switch 72 with respect to a coordinate axis imaginarily set on the screen SC. The coordinate axis is set on the screen SC with reference to, for example, a region in which the projecting unit 20 projects a projected image on the screen SC (a projection region). Therefore, a coordinate of a pointed position of the pointer 70 in the projection region is calculated by the coordinate calculating unit 55.

The control unit 30 reads out and executes the control program 36 stored in the storing unit 35 to thereby realize functions of a projection control unit 31, a detection control unit 32 (an input detecting unit), a rendering control unit 33 (a rendering unit), and an overlay control unit 34 (a display control unit) and controls the units of the projector 10.

The projection control unit 31 detects, on the basis of operation data input from the operation detecting unit 17, content of operation performed by an operator and controls the image processing unit 40, the light-modulating-device driving unit 15, the projection-optical-system driving unit 16, and the light-source driving unit 14 according to the operation to project an image on the screen SC. The projection control unit 31 controls the projection-optical-system driving unit 16 to execute focus adjustment, zoom adjustment, diaphragm adjustment, and the like by the projection optical system 23.

The detection control unit 32 controls the position-input detecting unit 50 to detect a pointed position of the pointer 70 and an operation state of the operation switch 72 included in the pointer 70. Upon detecting that the operation switch 72 is turned on, the detection control unit 32 acquires a coordinate of the pointer 70 at that point and outputs the coordinate to the rendering control unit 33.

The rendering control unit 33 renders the rendered images 210 and 211 (FIG. 1) or the like to follow the operation by the pointer 70 detected by the detection control unit 32. When the position coordinate of the pointer 70 at the time of turn-on of the operation switch 72 is input from the detection control unit 32, the rendering control unit 33 renders a figure or the like having the coordinate as a vertex or an endpoint and generates image data of a rendered image. For example, the rendering control unit 33 renders a straight line or a curved line connecting a coordinate input last time and a coordinate input this time from the detection control unit 32 and generates image data of the straight line or the curved line.

The rendering control unit 33 acquires attributes of a figure rendered by the PC 100 in the rendering mode and performs rendering according to the acquire attributes. That is, the rendering control unit 33 detects, from image data input from the PC 100, attributes such as a shape, a color of a line, and the thickness of the line of the figure rendered by the PC 100. The rendering control unit 33 renders, on the basis of the coordinate detected by the detection control unit 32, a figure that looks the same as the figure rendered by the PC 100. The rendering control unit 33 may transmit and receive control data concerning attributes of a figure to be rendered between the rendering control unit 33 and the PC 100 and determine the attributes of the figure to be rendered.

The overlay control unit 34 outputs the image data rendered by the rendering control unit 33 to the image processing unit 40 and causes the rendering processing unit 43 to superimposed (overlay)-render the image data on an image based on the image data received from the PC 100. When a predetermined condition is met, the overlay control unit 34 stops the output of the image data to the image processing unit 40 and causes the rendering processing unit 43 to stop the overlay rendering. When the overlay rendering is stopped, the rendering processing unit 43 renders, in the frame memory 44, only the image based on the image data input from the PC 100. Therefore, only the image based on the image data output from the PC 100 is projected on the screen SC.

The operation for starting and stopping the overlay rendering by the overlay control unit 34 is explained. When the detection control unit 32 detects a coordinate of a pointed position of the pointer 70 and the rendering control unit 33 generates image data, the overlay control unit 34 quickly causes the rendering processing unit 43 to start the overlay rendering.

Thereafter, the overlay control unit 34 determines whether an image rendered based on the coordinate detected by the detection control unit 32 is included in the image data input from the PC 100. When determining that the rendered image is included, the overlay control unit 34 stops the overlay rendering. Therefore, the image rendered by the rendering control unit 33 is overlay-rendered after the operation switch 72 detects a coordinate until an image rendered by the PC 100 on the basis of the coordinate is input. The determination is performed by detecting a new rendered image in the image data input from the PC 100. For example, the overlay control unit 34 calculates a difference between input image data input from the PC 100 when the operation switch 72 detects a coordinate of a pointed position of the pointer 70 anew and image data input thereafter and detects the new rendered image. The overlay control unit 34 may determine whether a figure or the like is included in the vicinity of the coordinate detected by the detection control unit 32 in the image data input from the PC 100.

When time from detection of a coordinate by the operation switch 72 until an input of an image rendered by the PC 100 on the basis of the coordinate is known in advance, the overlay control unit 34 may set in advance time from a start until an end of the overlay rendering. In this case, when the set time elapses from the start of the overlay rendering, the overlay control unit 34 stops the overlay rendering.

FIG. 3 is an explanatory diagram showing an example of operation modes of the PC 100.

The PC 100 is capable of switching and executing a plurality of operation modes including at least a rendering mode for performing rendering on the basis of a pointed position of the pointer 70 and operation modes other than the rendering mode. As shown in FIG. 2, in this embodiment, besides the rendering mode, the PC 100 has a PC operation mode for treating a coordinate of a pointed position of the pointer 70 as an input coordinate by the pointing device. The PC 100 may be capable of executing operation modes other than the rendering mode and the PC operation mode.

The switching of the operation modes of the PC 100 is performed according to operation by an input device of the PC 100 or operation of the rendering mode switching button 202 or the PC operation mode switching button 203 of the toolbar 201 (FIG. 1).

In the PC operation mode, the PC 100 displays a pointer corresponding to an input coordinate of the pointing device on image data output to the projector 10. The pointer is, for example, a pointer generally used in a personal computer. Examples of the pointer include a pointer having an arrow shape.

Only when the PC 100 is executing the "rendering mode" for performing rendering on the basis of a coordinate of a pointed position of the pointer 70, the overlay control unit 34 executes the overlay rendering. As explained above, the PC 100 can switch and execute the rendering mode and the PC operation mode. In the PC operation mode, since the PC 100 changes an image output to the projector 10 on the basis of the coordinate of the pointed position of the pointer 70 in the same manner as the case of the operation of the pointing device, the PC 100 does not perform rendering based on the coordinate of the pointed position. Therefore, the overlay control unit 34 has a function of determining whether the PC 100 is in the rendering mode. Only while the PC 100 is in the rendering mode, the overlay control unit 34 starts the overlay rendering.

The overlay control unit 34 determines, for example, on the basis of a pointer included in image data input from the PC 100, whether the PC 100 is in the rendering mode or the PC operation mode. In an example shown in FIG. 2, when an arrow-shaped pointer is included in input image data of the PC 100, the overlay control unit 34 determines that the PC 100 is operating in the PC operation mode. When the arrow-shaped pointer is not included in the input image data, the overlay control unit 34 determines that the PC 100 is operating in the rendering mode.

The PC 100 includes a control unit 101 configured to centrally control the units of the PC 100. The control unit 101 is realized by, for example, a CPU, a ROM having stored therein a basic control program and the like executed by the CPU, and a RAM that temporarily stores programs executed by the CPU, data processed by the CPU, and the like. The PC 100 includes an input unit 106 configured to detect input operation by an input device including pointing devices such as a keyboard and a mouse, a display control unit 107 configured to cause a monitor (a display unit) 108 to display content of the input operation detected by the input unit 106, a processing result by the control unit 101, and the like, an external interface 109 connected to an external apparatus such as the projector 10, and a storing unit 110 configured to store various programs including a control program 111 executed by the control unit 101, data processed by the programs, and the like. A wireless LAN interface 112 configured the same as the wireless LAN interface 12 is connected to the external interface 109. The external interface 109 is capable of executing radio communication with the I/F unit 11.

The control unit 101 executes the control program 111 to thereby realize functions of an apparatus control unit 102, an image selecting unit 103, an image output unit 104, and a rendering processing unit 105.

The apparatus control unit 102 executes, for example, processing for controlling the projector 10 in the PC operation mode and processing for receiving data transmitted from the projector 10. The apparatus control unit 102 controls the operation mode of the PC 100. When the operation mode is designated by operation detected by the input unit 106 and when determining that a coordinate input from the projector 10 is operation of the rendering mode switching button 202 or the PC operation mode switching button 203 of the toolbar 201 (FIG. 1), the apparatus control unit 102 executes the designated operation mode. In the PC operation mode, the apparatus control unit 102 processes the coordinate input from the projector 10 as an input coordinate by the pointing device connected to the input unit 106. In the rendering mode, the apparatus control unit 102 outputs the coordinate input from the projector 10 to the rendering processing unit 105 and causes the rendering processing unit 105 to execute operation of rendering.

Further, the apparatus control unit 102 transmits, in response to a request transmitted from the projector 10, control data concerning attributes of a figure rendered by the rendering processing unit 105 to the projector 10.

When image data is output to the projector 10, the image selecting unit 103 selects, according to operation detected by the input unit 106, the image data output to the projector 10. For example, the image selecting unit 103 can select image data directly designated by operation by the user out of image data (not shown in the figure) stored in the storing unit 110 or can select the image data in the storing unit 110 in order set in advance.

The image output unit 104 outputs the image data selected by the image selecting unit 103 to the projector 10. The image output unit 104 may perform processing for converting the resolution and the frame rate of the selected image data according to the specifications of the projector 10.

When a coordinate of a pointed position of the pointer 70 is input from the apparatus control unit 102 while the PC 100 is executing the rendering mode, the rendering processing unit 105 executes rendering processing for generating or updating an image according to the coordinate and outputs image data. The image data output by the rendering processing unit 105 is output to the projector 10 by the image output unit 104.

Figures 4A, 4B:
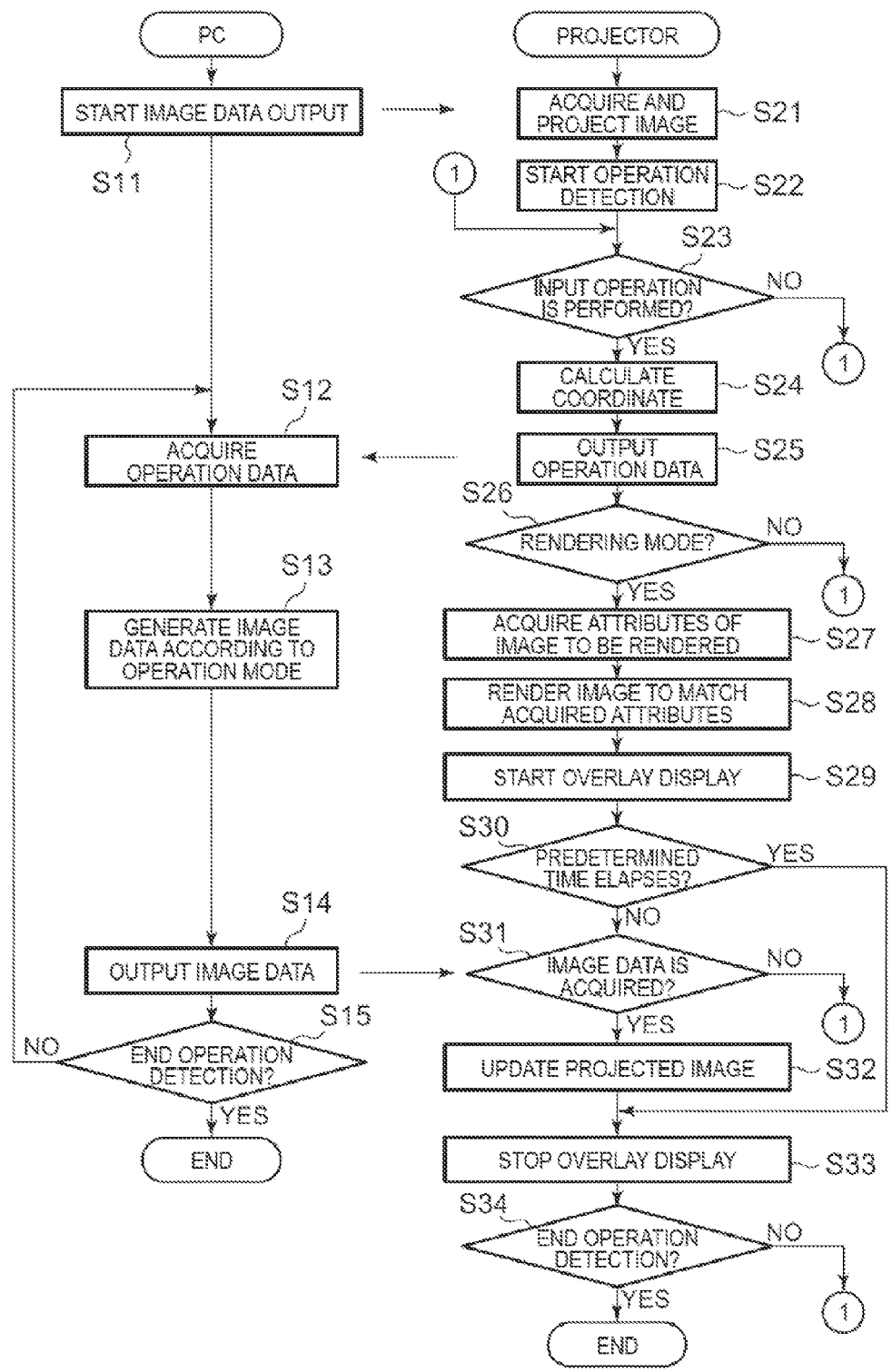

FIGS. 4A and 4B are flowcharts for explaining the operation of the projection system 1. FIG. 4A is a flowchart for explaining the operation of the PC 100. FIG. 4B is a flowchart for explaining the operation of the projector 10. In FIGS. 4A and 4B, in particular, operations performed according to the operation of the pointer 70 are shown.

In a state in which the projector 10 and the PC 100 are connected, when the PC 100 starts an output of image data (step S11), the projection control unit 31 of the projector 10 acquires the image data input from the PC 100, renders an image in the frame memory 44 on the basis of the image data, and projects the image using the projecting unit 20 (step S21). The detection control unit 32 of the projector 10 starts detection of the position of the pointer 70 and detection of the operation of the operation switch 72 (step S22) and stays on standby until the detection control unit 32 detects the operation (step S23).

Upon detecting the operation by the pointer 70 (Yes in step S23), the detection control unit 32 detects the position of the tip of the pointer 70 during the operation and calculates a coordinate of the detected position (step S24). Further, the detection control unit 32 generates operation data including the calculated coordinate and outputs the operation data to the PC 100 (step S25).

The control unit 101 of the PC 100 receives and acquires operation data transmitted from the projector 10 (step S12) and generates image data according to the operation mode being executed by the PC 100 (step S13). When the PC 100 is executing the rendering mode, the rendering processing unit 105 renders a figure according to an input coordinate included in the received operation data and generates image data including the rendered figure. When the PC 100 is executing the PC operation mode, the control unit 101 sets the input coordinate included in the received operation data as an input coordinate of the pointing device and receives the operation data as processing data for a file or a folder. In this case, the control unit 101 generates, on the basis of the input coordinate, image data of an operation screen displayed on the monitor 108 by the PC 100.

The apparatus control unit 102 transmits the generated image data to the projector 10 via the wireless LAN interface 112 (step S14) and determines whether the apparatus control unit 102 ends the operation by the pointer 70 (step S15). When continuing the operation corresponding to the operation of the pointer 70 (No in step S15), the apparatus control unit 102 returns to step S12 and stays on standby until the apparatus control unit 102 receives operation data. If input operation or the like for instructing the end of the operation of the pointer 70 is performed (Yes in step S15), the apparatus control unit 102 ends the processing.

The overlay control unit 34 determines whether the operation mode being executed by the PC 100 is the rendering mode (step S26). For example, as explained above, the overlay control unit 34 detects a pointer included in image data input from the PC 100 to thereby determine whether the operation mode being executed by the PC 100 is the rendering mode. When the overlay control unit 34 determines that the PC 100 is not in the rendering mode (No in step S26), the operation of the projector 10 returns to step S23. On the other hand, when the overlay control unit 34 determines that the operation mode of the PC 100 is the rendering mode (Yes in step S26), the rendering control unit 33 acquires attributes of a figure or the like to be rendered (step S27). The rendering control unit 33 renders the figure or the like to match the acquired attributes and generates an image to be overlay-displayed (step S28). The overlay control unit 34 causes the rendering processing unit 43 to overlay-display the image generated by the rendering control unit 33 (step S29).

In the operation illustrated in FIGS. 4A and 4B, when time from the start of the overlay display reaches a predetermined time or when image data rendered on the basis of a coordinate detected by the detection control unit 32 is input from the PC 100, the overlay control unit 34 stops the overlay display. That is, the overlay control unit 34 determines whether the predetermined time elapses from the start of the overlay display (step S30). When the predetermined time elapses (Yes in step S30), the overlay control unit 34 shifts to step S33 explained below. When the predetermined time does not elapse (No in step S30), the overlay control unit 34 determines whether image data including an image rendered on the basis of the coordinate detected by the detection control unit 32 is input from the PC 100 (step S31). When the pertinent image data is not input (No in step S31), the operation of the projector 10 returns to step S23. When the image data including the image rendered on the basis of the input coordinate is input from the PC 100 (Yes in step S31), the overlay control unit 34 projects an image based on the image data input anew (step S32) and shifts to step S33.

In step S33, the overlay control unit 34 stops the overlay display by the rendering processing unit 43 and causes the projecting unit 20 to project only the image based on the image data input from the PC 100. Thereafter, the detection control unit 32 determines whether the detection control unit 32 ends the detection of the operation by the pointer 70 (step S34). When continuing the detection of the operation (No in step S34), the detection control unit 32 returns to step S23. When input operation or the like for instructing the end of the operation of the pointer 70 is performed (Yes in step S34), the detection control unit 32 ends the processing.

As explained above, the projection system 1 according to the embodiment to which the invention is applied includes the PC 100 configured to output image data and the projector 10 configured to display an image based on the image data output by the PC 100. The projector 10 includes the detection control unit 32 configured to detect position input operation to calculate an input coordinate and output the input coordinate to the PC 100, the rendering control unit 33 configured to perform rendering processing for generating an image on the basis of the input coordinate calculated by the detection control unit 32, and the overlay control unit 34 configured to superimpose the image generated by the rendering control unit 33 on an image based on image data output by the PC 100 and cause the projecting unit 20 to project the image. The PC 100 generates an image on the basis of the input coordinate output by the projector 10 and outputs image data including the generated image to the projector 10.

Consequently, in the configuration in which the PC 100 renders an image on the basis of the input coordinate of the position input operation by the pointer 70 detected by the projector 10 and the projector 10 displays the image, the image generated by the projector 10 is displayed before the image data including the image rendered by the PC 100 is input. Therefore, an image rendered according to the operation of the pointer 70 can be displayed even in a period until the image rendered by the PC 100 is displayed after the projector 10 detects the operation by the pointer 70. Therefore, even when a delay occurs in timing when the image data is input to the projector 10 from the PC 100, it is possible to display the image without delay.

The overlay control unit 34 stops, on the basis of the predetermined condition, the superimposed display of the image generated by the rendering control unit 33. For example, when the image data including the image rendered by the PC 100 on the basis of the input coordinate is input, the overlay control unit 34 stops the superimposed display. In this way, the overlay control unit 34 stops the overlay display, for example, when it is unnecessary to overlay-display the image generated by the projector 10. Therefore, the display of the input image from the PC 100 is not prevented. For example, when there is a slight difference between a figure or the like rendered by the PC 100 and a figure or the like rendered by the rendering control unit 33, blurring and the like of the figures are seen if these figures are overlay-displayed. As in this embodiment, the overlay display is immediately stopped when it is unnecessary to perform the overlay display. Consequently, it is possible to prevent deterioration in the quality of a projected image.

The over lay control unit 34 may stop the superimposed display when a predetermined time elapses after the superimposed display of the image generated by the rendering control unit 33 is started. In this case, as in the case explained above, the image generated by the projector 10 can be superimposed-displayed only in a period until the image data including the image rendered by the PC 100 on the basis of the input coordinate is input. Since timing for stopping the overlay display can be determined on the basis of time from the start of the overlay display, it is possible to attain efficiency of processing.

The overlay control unit 34 is characterized by stopping the superimposed display when image data input from the PC 100 is the image data including the image rendered on the basis of the input coordinate calculated by the detection control unit 32.

According to the embodiment, the superimposed display is stopped when the image rendered by the PC 100 on the basis of the input coordinate is included in the image data input from the PC 100. Therefore, the image generated by the projector 10 is superimposed-displayed, for example, only in a period until the image rendered on the basis of the input coordinate by the PC 100 is input. Therefore, only when necessary, the image rendered by the projector 10 is displayed until the image rendered by the PC 100 is input. Therefore, it is possible to prevent, for example, deterioration in operability due to unnecessary operation. Even when an image rendered by the projector 10 and an image rendered by the PC 100 on the basis of the same input coordinate are different, it is possible to compensate for a delay in an input of an image without causing a sense of discomfort.

In this embodiment, the invention is applied to the projector 10 including the illumination optical system 21, the light modulating device 22 configured to modulate light emitted by the illumination optical system 21, and the projection optical system 23 configured to project the light modulated by the light modulating device 22 on the screen SC. The detection control unit 32 detects position input operation on the screen SC. Therefore, it is possible to quickly perform rendering and project a rendered figure or the like according to operation applied to the screen SC by the pointer 70. Therefore, since processing for rendering and projecting a figure quickly follows the operation of the pointer 70, it is possible to realize satisfactory feeling of operation and achieve improvement of operability. Even if the PC 100 that renders a figure or the like is set in a place apart from the projector 10, it is possible to perform rendering quickly responding to the operation of the pointer 70 irrespective of the magnitude of a delay in transmission of image data from the PC 100 to the projector 10. Therefore, there is an advantage that a degree of freedom is high concerning setting locations of the projector 10 and the PC 100 and it is easy to secure a setting location including the screen SC.

The PC 100 can execute a plurality of operation modes including the rendering mode. When the PC 100 is executing the rendering mode, the overlay control unit 34 superimposes and displays an image generated by the rendering control unit 33. Therefore, it is possible to render a figure or the like and perform the overlay display only when rendering by the projector 10 is necessary.

The rendering control unit 33 performs rendering to match attributes of an image generated by the PC 100 on the basis of an input image. Therefore, a sense of discomfort is not caused when the overlay display is started and stopped. It is possible to keep satisfactory display quality.

The embodiment explained above is only an example of a specific form to which the invention is applied. The embodiment does not limit the invention. The invention can also be applied as a form different from the embodiment. For example, in the example explained in the embodiment, the position-input detecting unit 50 receives infrared light to thereby calculate a coordinate of a pointed position of the pointer 70. However, photographed image data photographed by an image pickup element that receives visible light may be processed to calculate a coordinate of a pointed position. For example, a pressure-sensitive or capacitance touch panel that detects contact operation may be arranged to calculate a coordinate of an operation position on the touch panel. In the configuration of the embodiment, the pointer 70 is not limited to bar-type and pen-type pointers. Further, a configuration can also be adopted in which a finger of a user is used as a pointer and the projector 10 detects a pointed position of the finger.

In the embodiment, as the example of the light modulating device 22 that modulates light emitted by the light source, the configuration including the three transmissive liquid crystal panels corresponding to the respective colors of RGB is explained. However, the invention is not limited to this example. For example, the light modulating device 22 may be configured by using three reflective liquid crystal panels, combining one liquid crystal panel and a color wheel, using three digital mirror devices (DMD), or combining one digital mirror device and a color wheel. When only one liquid crystal panel or DMD is used as a light modulating device, a member equivalent to a combination optical system such as a cross-dichroic prism is unnecessary. Besides the liquid crystal panel and the DMD, a light modulating device capable of modulating light emitted by the light source can be adopted without a problem.

Further, the display apparatus according to the embodiment is not limited to the projector that projects an image on the screen SC. Various display apparatuses such as self-emitting display apparatuses including a liquid crystal monitor or a liquid crystal television that displays an image on a liquid crystal display panel, a monitor apparatus or a television receiver that displays an image on a PDP (plasma display panel), and a monitor apparatus or a television receiver that displays an image on an organic EL display panel called OLED (Organic light-emitting diode) or OEL (Organic Electro-Luminescence) are also included in the image display apparatus according to the embodiment. In this case, the liquid crystal panel, the plasma display panel, and the organic EL display panel are equivalent to the display unit.

The functional units of the projection system 1 shown in FIG. 2 indicate functional components. A specific embodiment of the functional units is not specifically limited. That is, hardware individually corresponding to the functional units does not always need to be mounted. It is naturally possible to adopt a configuration in which one processor executes a program to realize functions of a plurality of functional units. A part of the functions realized by software in the embodiment may be realized by hardware or a part of the functions realized by hardware in the embodiment may be realized by software. Besides, the specific detailed configurations of the other units of the projection system 1 can be arbitrarily changed without departing from the spirit of the invention.

Second Embodiment

A second embodiment is explained.

Figure 5:
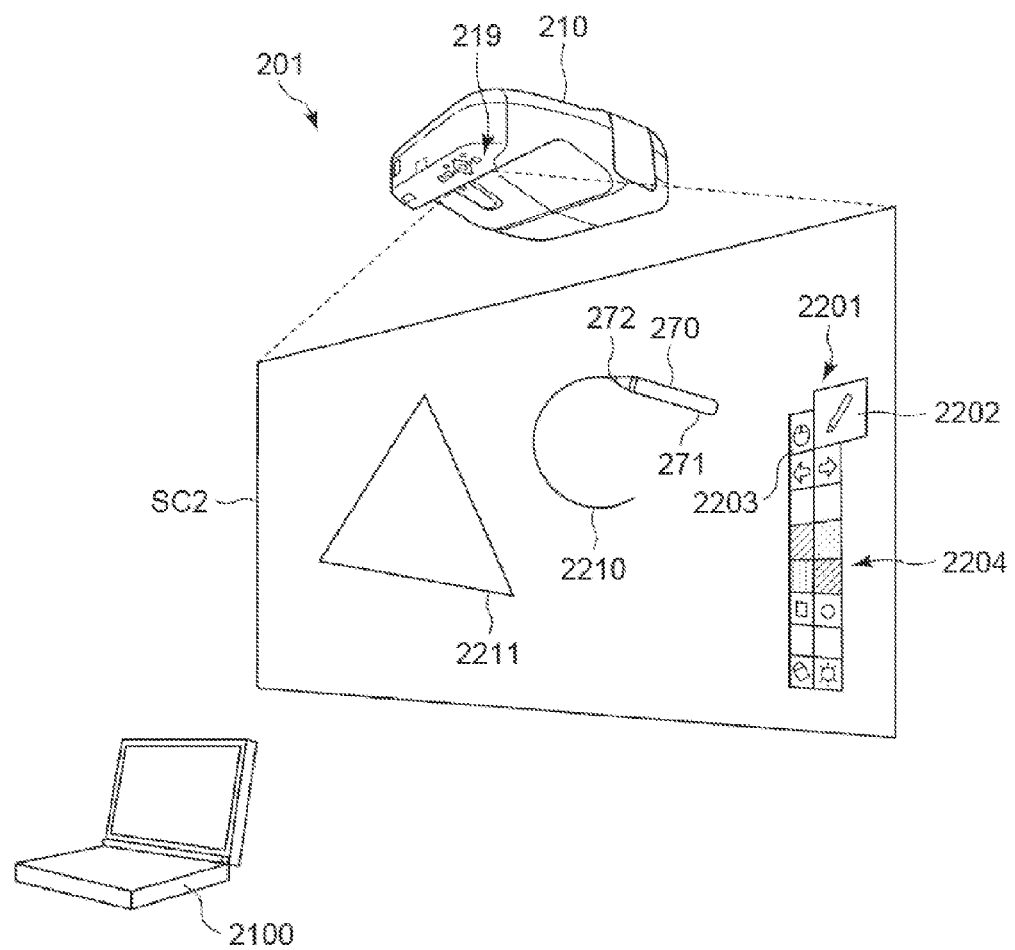
FIG. 5 is a diagram showing the configuration of a projection system according to a second embodiment.

FIG. 5 is a diagram showing the configuration of a projection system 201 according to an embodiment to which the invention is applied. The projection system 201 is configured to connect a PC (personal computer) 2100, which is an external apparatus independent from a projector 210, to the projector 210 set above a screen SC2.

The projector 210 (a display apparatus, a data processing apparatus) projects, on the screen SC2 functioning as a projection surface, an image based on image data input from the PC 2100 functioning as an image output apparatus. The projector 210 is a short focus type and is set right above the screen SC2. The projector 210 projects the image obliquely downward.

The projector 210 can not only project an image based on image data transmitted from the PC 2100 but also project, on the screen SC2, an image generated as explained below in the inside of the projector 210.

The projector 210 can project image data received from the PC 2100 irrespective of whether the image data is still image data or moving image (video) data. The screen SC2 is not limited to a flat plate fixed to a wall surface. The wall surface itself can be used as the screen SC2.

In the projection system 201, a user can perform operation using a pointer 270 on the screen SC2 on which the projector 210 projects an image. The pointer 270 is, for example, a pen-type device. The user uses the pointer 270 holding a shaft section 271 by hand and pressing a tip of the pointer 270 against the screen SC2. An operation switch 272 for detecting pressing operation is provided at the tip of the pointer 270. When the user presses the tip of the pointer 270 against the screen SC2, the operation switch 272 is turned on. The user presses the tip of the pointer 270 against the screen SC2 in an arbitrary position on the screen SC2 to perform position input operation.

As explained below, the projector 210 has a function of detecting the position of the pointer 270 on the screen SC2. When the user performs the position input operation, a position where the tip of the pointer 270 touches the screen SC2 is detected as a pointed position.

The projection system 201 functions as an interactive whiteboard system configured to receive the position input operation performed by the user using the pointer 270 and reflect the operation on a projected image. Specifically, when detecting position input operation performed by the user, the projection system 201 renders a figure such as a straight line, a curved line, or a polygon according to a pointed position and projects the rendered figure on the screen SC2. In a state in which some image is projected on the screen SC2, the projection system 201 can render an image to overlap the projected image. The projection system 201 can start rendering of an image after shifting to a state in which no image is projected. The image rendered by this function can be stored as image data. Only the rendered image can be stored as image data or can be stored as one image data together with the projected image projected on the screen SC2 during the rendering.

The projection system 201 can execute both of a "PJ mode" in which the projector 210 executes a function of generating an image according to a pointed position of the pointer 270 and projecting the image on the projector 210 and a "PC mode" in which the PC 2100 executes the function. In the "PJ mode", the projector 210 detects a pointed position of the pointer 270, generates an image according to the detected pointed position, and projects the image on the screen SC2.

A toolbar 2201 is projected on the screen SC2 together with a projected image. On the toolbar 2201, a plurality of function buttons 2204 and the like for causing the projector 210 to execute various functions are arranged. When a position overlapping any one of the function buttons 2204 is pointed by the operation of the pointer 270, the projector 210 executes a function allocated to the function button 2204 corresponding to the pointed position. In an example shown in FIG. 5, on the toolbar 2201, a rendering mode switching button 2202 and a PC operation mode switching button 2203 are arranged. The rendering mode switching button 2202 is a button for instructing switching to an operation mode for performing rendering according to the operation of the pointer 270 (a rendering mode). The PC operation mode switching button 2203 is a button for instructing switching to a PC operation mode for using the pointer 270 as a pointing device of the PC 2100. When the pointer 270 can be used, the toolbar 2201 is always projected to be superimposed on the projected image or independently projected.

In this way, in the projection system 201, operation for rendering figures such as rendered images 2210 and 2211 and operation on the PC 2100 can be performed by the operation performed using the pointer 270.

Figure 6:
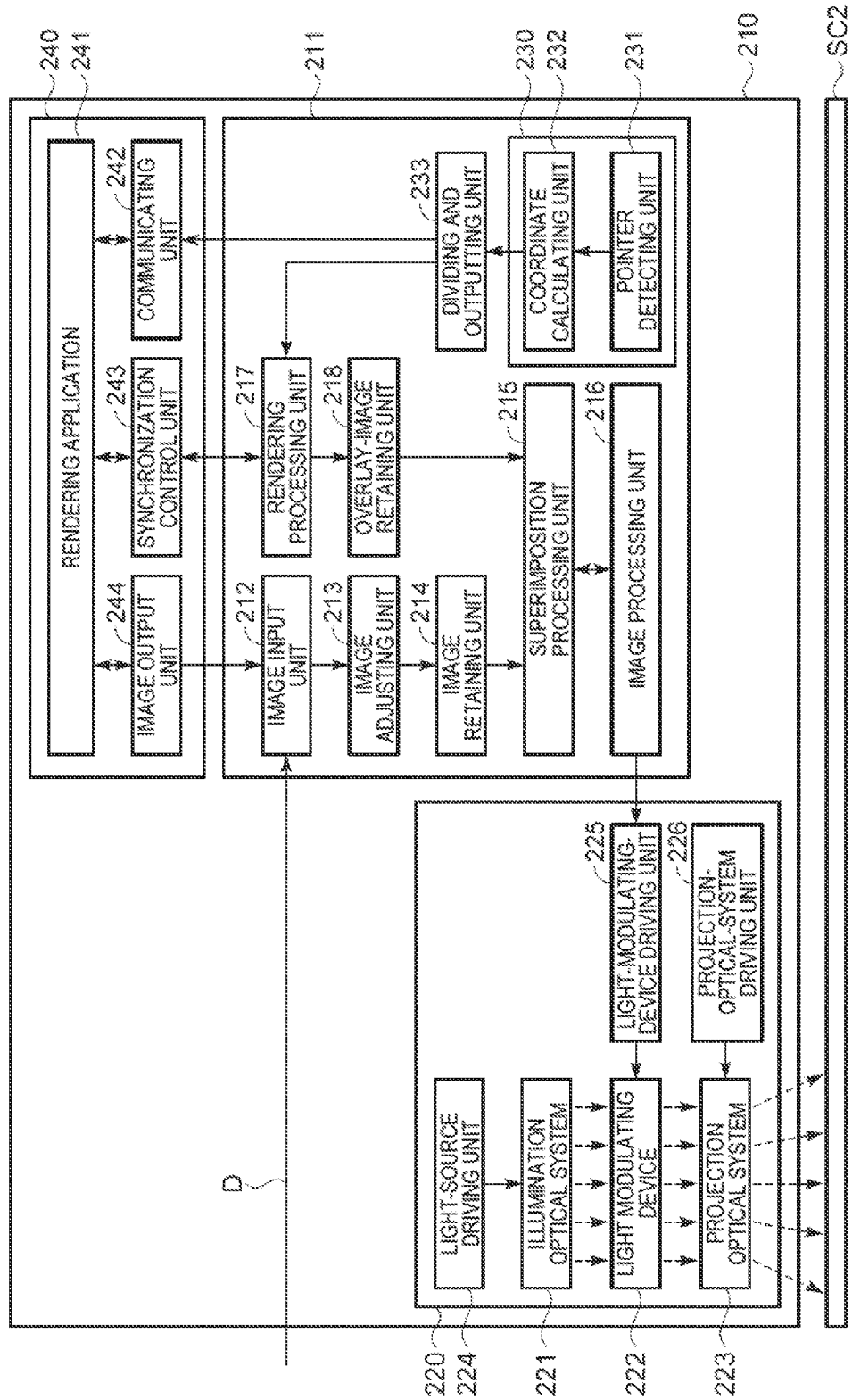
FIG. 6 is a functional block diagram showing the configuration of a main part of a projector.

FIG. 6 is a functional block diagram showing a main part configuration of the projector 210 included in the projection system 201.

The projector 210 includes an input interface (not shown in the figure) to which image data D is input from the external apparatuses such as the PC 2100, a video reproducing apparatus, and a DVD reproducing apparatus. The interface includes, for example, a wired or wireless USB interface, a wired or wireless LAN interface, a VGA terminal to which an analog video signal is input, a DVI (Digital Visual Interface) terminal to which digital image data is input, an S video terminal to which composite video signals such as NTSC, PAL, and SECAM are input, an RCA terminal to which a composite video signal is input, a D terminal to which a component video signal is input, and an HDMI connector conforming to an HDMI (registered trademark) standard. The projector 210 projects an image on the screen SC2 on the basis of the image data D input from the interface.

The projector 210 includes a projecting unit 220 configured to form an optical image and a main processor 211 (a first processing device) configured to process image data. A sub-processor 240 (a second processing device) configured to render figures such as the rendered images 2210 and 2211 according to the operation of the pointer 270 is connected to the main processor 211.

Besides the units shown in FIG. 6, the projector 210 includes a nonvolatile storing unit having stored therein, in a non-volatile manner, programs executed by and data processed by the main processor 211 and the sub-processor 240, a work memory configured to temporarily store programs executed by and data processed by the main processor 211 and the sub-processor 240, a frame memory configured to retain, in a frame unit, an image projected by the projecting unit 220, an operation detecting unit configured to detect operation of the operation panel 219 and operation by a remote controller (not shown in the figure), and an image pickup unit configured to photograph an image for detecting the position of the pointer 270 on the screen SC2. However, the units are not shown in the figure.

The projecting unit 220 (a display unit) includes an illumination optical system 221, a light modulating device 222, and a projection optical system 223. The illumination optical system 221 includes a light source configured by a Xenon lamp, an extra-high pressure mercury lamp, an LED (Light Emitting Diode), or a laser light source. The illumination optical system 221 may include a reflector and an auxiliary reflector configured to guide light emitted by the light source to the light modulating device 222 or may include a lens group (not shown in the figure) or a sheet polarizer for improving an optical characteristic of projected light or a dimming element for reducing a light amount of the light emitted by the light source on a path leading to the light modulating device 222.

The light modulating device 222 includes, for example, three transmissive liquid crystal panels corresponding to the three primary colors of RGB and modulates light transmitted through the liquid crystal panels to generate image light. The light from the illumination optical system 221 is separated into color lights of the three colors of RGB. The color lights are made incident on the liquid crystal panels corresponding thereto. The color lights transmitted through the liquid crystal panels to be modulated are combined by a combination optical system such as a cross-dichroic prism and emitted to the projection optical system 223.

The projection optical system 223 includes a zoom lens for performing enlargement and reduction of an image to be projected and adjustment of a focus, a motor for zoom adjustment for adjusting a degree of zoom, a motor for focus adjustment for performing adjustment of a focus, and a concave mirror configured to reflect projected light toward the screen SC2. The projection optical system 223 performs zoom adjustment and focus adjustment for image light modulated by the light modulating device 222, guides the light passed through the lens group in the screen SC2 direction using the concave mirror, and focuses the light on the screen SC2. A projection-optical-system driving unit 226 configured to drive the motors included in the projection optical system 223 and a light-source driving unit 224 configured to drive the light source included in the illumination optical system 221 are connected to the projecting unit 220. A specific configuration of the projection optical system 223 is not limited to the example explained above. For example, in a configuration in which the mirror including the concave mirror is not used, it is also possible to project the light modulated by the light modulating device 222 on the screen SC2 using a lens and focus the light.

The image data D output by the PC 2100 is input to the main processor 211. The main processor 211 includes an image input unit 212 configured to acquire the image data D, an image adjusting unit 213 configured to process the image data D acquired by the image input unit 212, an image retaining unit 214 configured to temporarily retain the image data D processed by the image adjusting unit 213 and output the image data D at predetermined timing, a superimposition processing unit 215 configured to perform processing for superimposing an image based on the image data D output by the image retaining unit 214 and an overlay image explained below, and an image processing unit 216 configured to render an image in a frame unit in a frame memory (not shown in the figure) on the basis of the image processed by the superimposition processing unit 215 and output the image to the light-modulating-device driving unit 225. The main processor 211 functions as an output unit and a display control unit according to the function of the superimposition processing unit 215.

The image adjusting unit 213 executes, for example, resolution conversion processing for converting the resolution of the image data D acquired by the image input unit 212 to match the resolution of the liquid crystal panels included in the light modulating device 222 and processing for converting the frame rate of the image data D.

The main processor 211 includes a coordinate detecting unit 230 configured to detect, on the basis of photographed image data photographed by a not-shown image pickup unit, operation of the pointer 270 performed on the screen SC2. The coordinate detecting unit 230 (an input detecting unit, a coordinate acquiring unit) includes a pointer detecting unit 231 configured to detect the position of the pointer 270 from the photographed image data and a coordinate calculating unit 232 configured to calculate and output a coordinate of the position detected by the pointer detecting unit 231.

The pointer 270 includes a light-emitting unit such as an infrared LED configured to output an infrared signal, a control circuit configured to control light emission of the infrared LED, and a power supply. The pointer 270 transmits the infrared signal according to an operation state (ON/OFF) of the operation switch 272. Therefore, it is possible to photograph the pointer 270 during operation by photographing the screen SC2 using an image pickup element that receives infrared light.

The coordinate calculating unit 232 calculates a coordinate of a position pointed on the screen SC2 by the tip of the pointer 270, i.e., a coordinate of a pointed position. The coordinate calculated by the coordinate calculating unit 232 is, for example, a coordinate based on a region where the projecting unit 220 projects a projected image on the screen SC2 (a projection region).

A dividing and outputting unit 233 configured to divide and output the coordinate calculated by the coordinate calculating unit 232 is connected to the coordinate detecting unit 230. Output destinations of the dividing and outputting unit 233 are a rendering processing unit 217 included in the main processor 211 and the sub-processor 240. Every time the coordinate calculating unit 232 calculates a coordinate, the dividing and outputting unit 233 outputs the calculated coordinate to the rendering processing unit 217 and the sub-processor 240. The coordinate output to the rendering processing unit 217 and the coordinate output to the sub-processor 240 are the same coordinate.

The rendering processing unit 217 performs, on the basis of the coordinate input from the dividing and outputting unit 233, processing for rendering figures such as the rendered images 2210 and 2211 (FIG. 5). An overlay-image retaining unit 218 configured to temporarily retain an image rendered by the rendering processing unit 217 and output the image to the superimposition processing unit 215 at predetermined timing is connected to the rendering processing unit 217.

The superimposition processing unit 215 acquires image data for one frame from the image retaining unit 214 and expands the image in a memory (not shown in the figure) on the basis of the image data for one frame. The superimposition processing unit 215 acquires the rendered image from the overlay-image retaining unit 218 and overwrites the rendered image on the image expanded in the memory to thereby expand a superimposed image in the memory. The superimposition processing unit 215 outputs the image expanded in the memory to the image processing unit 216 and causes the projecting unit 220 to project the image.

On the other hand, the sub-processor 240 includes a rendering application 241 (a rendering unit) configured to render figures such as the rendered images 2210 and 2211 on the basis of the coordinate input from the dividing and outputting unit 233 of the main processor 211, a communicating unit 242 configured to acquire the coordinate input from the dividing and outputting unit 233 and communicate the coordinate to the rendering application 241, a synchronization control unit 243 configured to perform processing for synchronizing a condition for rendering and the like with the main processor 211, and an image output unit 244 configured to output image data of an image rendered by the rendering application 241 to the main processor 211. That is, the sub-processor 240 is a processor for performing rendering based on the coordinate calculated by the coordinate detecting unit 230 and outputting a rendered image to the main processor 211.

Besides the image data D, the image data of the rendered image is input to the image input unit 212 included in the main processor 211 from the sub-processor 240. The image input unit 212 superimposes the image data D and the image data input from the sub-processor 240 and outputs image data of a superimposed image to the image adjusting unit 213. Like the image data D independently input to the image adjusting unit 213, the image data is subjected to resolution conversion processing, frame rate conversion processing, and the like in the image adjusting unit 213 and output to the image retaining unit 214.

When rendering is performed according to operation by the pointer 270, the projector 210 calculates a coordinate of a pointed position of the pointer 270 using the coordinate detecting unit 230 and executes rendering using the sub-processor 240 on the basis of the coordinate. The projector 210 superimposes a rendered image rendered by the sub-processor 240 on an image based on the image data D input from the PC 2100 and projects a superimposed image on the screen SC2 using the function of the projecting unit 220.

In the projector 210, for example, when operation for moving the pointer 270 at high speed is performed, in some case, a rendered image follows the operation of the pointer 270 in a delayed manner. That is, timing of generation and projection of the rendered image is delayed with respect to the operation of the pointer 270. A cause of the delay is considered to be a delay caused by limitation of band width of a bus that connects the main processor 211 and the sub-processor 240 or a delay that occurs because the image input unit 212 and the image adjusting unit 213 apply processing to the image data of the rendered image generated by the sub-processor 240.

Therefore, the projector 210 performs rendering to follow the operation of the pointer 270 using the sub-processor 240 and, on the other hand, performs rendering using the rendering processing unit 217 in the main processor 211 as well. A rendered image rendered by the rendering processing unit 217 is input to the superimposition processing unit 215 through the overlay-image retaining unit 218. The superimposition processing unit 215 superimposes the image input to the image input unit 212 and the image rendered by the rendering processing unit 217. Therefore, the image data D, the rendered image rendered by the sub-processor 240, and the rendered image rendered by the rendering processing unit 217 are superimposed and projected.

Processing for performing rendering and projecting a rendered image by the rendering processing unit 217 is not affected by the band of the bus that connects the main processor 211 and the sub-processor 240 and a processing time by the image input unit 212 and the image adjusting unit 213. Therefore, the image rendered by the rendering processing unit 217 is projected earlier than the projection of the rendered image rendered by the sub-processor 240.

Figure 7:
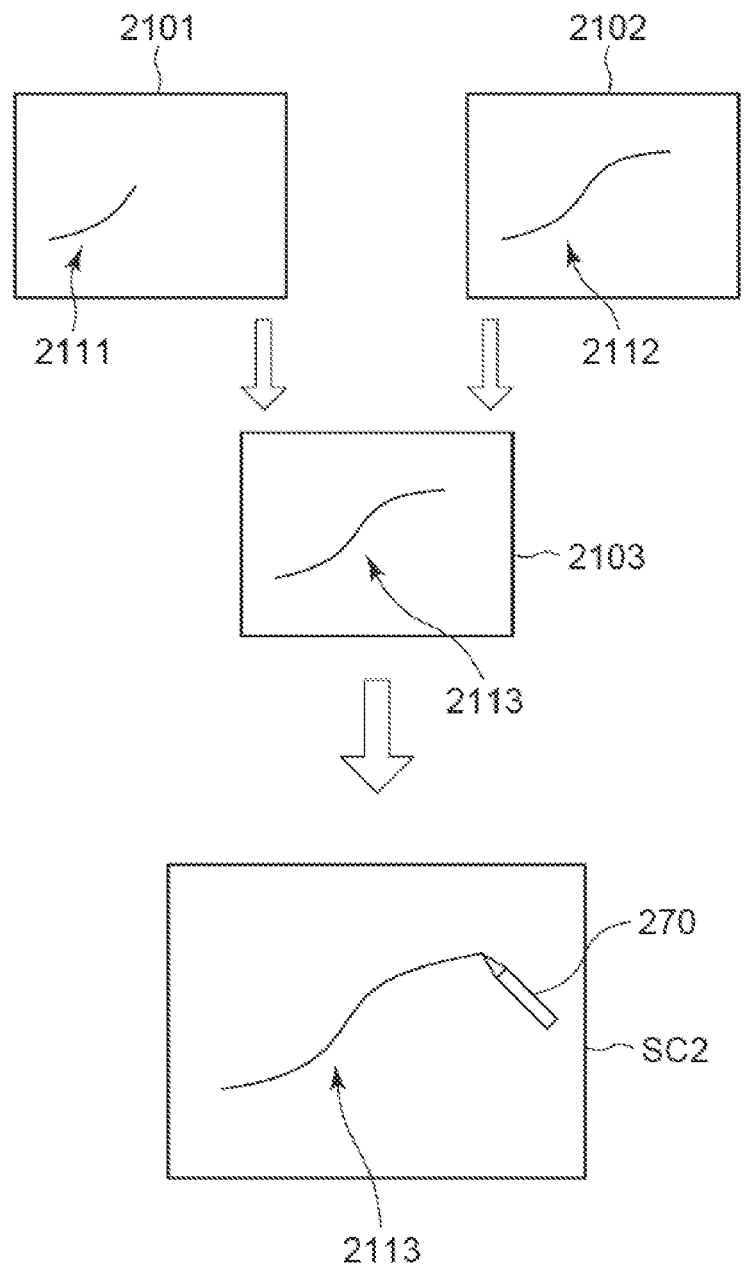
FIG. 7 is an explanatory diagram showing rendering processing executed by the projector.

FIG. 7 is an explanatory diagram showing a state of rendering processing executed by the projector 210.

In FIG. 7, a sub-processor rendered image (a second image) 2101 is an image rendered by the sub-processor 240 and input to the superimposition processing unit 215. A main processor rendered image (a first image) 2102 is an image rendered by the rendering processing unit 217 and input to the superimposition processing unit 215. A superimposed image 2103 is an image generated by the superimposition processing unit 215 by performing the superimposition processing.

As explained above, the main processor rendered image 2102 is input to the superimposition processing unit 215 earlier than the sub-processor rendered image 2101. Therefore, for example, immediately after the coordinate detecting unit 230 detects the operation of the pointer 270 and calculates a coordinate, as shown in FIG. 7, an image 2112, which is a figure extending along the entire track of the pointer 270, is rendered in the main processor rendered image 2102. In the sub-processor rendered image 2101, an image 2111 halfway in rendering of a part of the track is rendered.

The image 2111 included in the sub-processor rendered image 2101 is halfway in rendering because, for example, the rendering by the rendering application 241 is delayed by a delay in an output of a coordinate from the dividing and outputting unit 233 to the communicating unit 242 or a frame output by the image retaining unit 214 is delayed by several frames behind a frame output by the overlay-image retaining unit 218 due to a delay in transmission until an input of image data of a image rendered by the rendering application 241 to the image input unit 212 and a delay in processing of the image input unit 212 and the image adjusting unit 213.

When the superimposition processing unit 215 superimposes the sub-processor rendered image 2101 input from the image retaining unit 214 and the main processor rendered image 2102 input from the overlay-image retaining unit 218, the superimposed image 2103 is generated. The superimposed image 2103 includes an image 2113 equivalent to the entire track of the pointer 270 that should be rendered. That is, even if the image 2111 of the sub-processor rendered image 2101 is halfway in rendering, the image 2113 in a rendering-completed state is generated by the superimposition processing unit 215. Therefore, the image 2113 is projected on the screen SC2 following the operation of the pointer 270 without delay.

In this way, the projector 210 is configured such that, even if a delay occurs in a process in which the sub-processor 240 renders and projects an image, the main processor 211 performs rendering and transmits an image through a path in which a delay hardly occurs. The image rendered by the sub-processor 240 and the image rendered by the main processor 211 are superimposed and projected, whereby it is possible to render and project an image without delay.

Attributes of the image 2111 rendered by the rendering application 241 and attributes of the image 2112 rendered by the rendering processing unit 217 desirably coincide with each other. When a rendered image is formed by a figure including a straight line and/or a curved line, attributes of the image are line width, a color of the line, the shape of an endpoint of the line, a color for painting out the figure, and the like. The synchronization control unit 243 included in the sub-processor 240 and the rendering processing unit 217 transmit and receive information concerning attributes of images to be rendered each other after a coordinate is input from the dividing and outputting unit 233 or at every predetermined time and match the attributes of the images. Consequently, the projector 210 can render images having the same attributes in the rendering application 241 and the rendering processing unit 217.

The operation of the overlay-image retaining unit 218 for outputting the rendered image of the rendering processing unit 217 to the superimposition processing unit 215 is a temporary operation before the rendered image of the sub-processor 240 is rendered as an entire image that should be rendered. For example, even if a transmission delay or a delay in processing occurs, the image 2111 in the sub-processor rendered image 2101 shown in FIG. 7 changes to the image 2112 as time passes. Thereafter, it is unnecessary to superimpose the main processor rendered image 2102 on the sub-processor rendered image 2101. The image 2111 in the sub-processor rendered image 2101 and the image 2112 in the main processor rendered image 2102 do not always coincide with each other. For example, if interpolation processing or correction processing is performed in processing for converting resolution, deformation or a change in a color sometimes occurs in a boundary between a figure and a background. In this case, when the sub-processor rendered image 2101 and the main processor rendered image 2102 are superimposed, there is concern about a little deterioration in image quality, for example, an unclear overlapping portion of the image 2111 and the image 2112. Therefore, it is desirable to minimize a frequency and an execution time of the processing for superimposing the sub-processor rendered image 2101 and the main processor rendered image 2102.

Therefore, the projector 210 is configured such that the rendered image of the rendering processing unit 217 is input to the superimposition processing unit 215 every time the coordinate detecting unit 230 detects a coordinate of the pointer 270 and, thereafter, when the predetermined time elapses, the input of the rendered image from the overlay-image retaining unit 218 to the superimposition processing unit 215 is stopped. As a result, only the sub-processor rendered image 2101 of the sub-processor rendered image 2101 and the main processor rendered image 2102 is output to the superimposition processing unit 215. Therefore, only the sub-processor rendered image 2101 is displayed.

The projector 210 may be configured such that the superimposition processing is not performed when the image 2111 included in the sub-processor rendered image 2101 and the image 2112 included in the main processor rendered image 2102 are substantially the same according to the operation of the overlay-image retaining unit 218 or the superimposition processing unit 215. In this case, the image 2111 and the image 2112 are detected and compared. If the image 2111 and the image 2112 coincide with each other in portions exceeding a predetermined threshold, the superimposition processing is stopped. In this case, only the sub-processor rendered image 2101 of the sub-processor rendered image 2101 and the main processor rendered image 2102 is displayed.

Figures 8A, 8B:
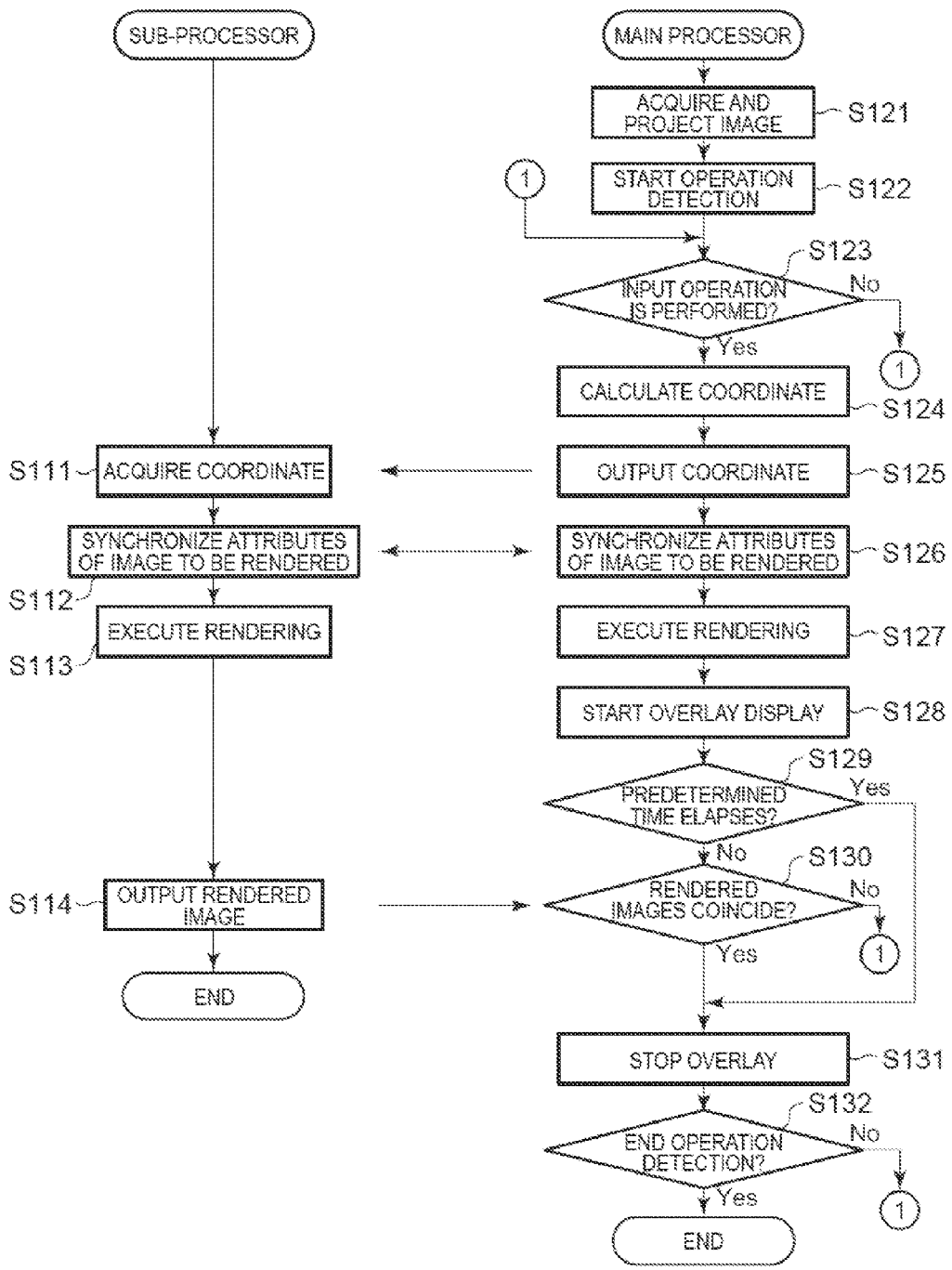
FIGS. 8A and 8B are flowcharts for explaining the operation of the projector.

FIGS. 8A and 8B are flowcharts for explaining the operation of the projector 210. In particular, processing for performing rendering according to the operation of the pointer 270 is explained. FIG. 8A is a flowchart for explaining the operation of the sub-processor 240 and FIG. 8B is a flowchart for explaining the operation of the main processor 211.

The main processor 211 acquires the image data D input from the PC 2100 and starts projection through processing by the image input unit 212 and the image adjusting unit 213 (step S121). The coordinate detecting unit 230 starts detection of the operation of the pointer 270 (step S122) and stays on standby until the operation is detected (step S123).

When the operation by the pointer 270 is detected by the pointer detecting unit 231 (Yes in step S123), the coordinate detecting unit 230 calculates a coordinate of a position detected by the coordinate calculating unit 232 (step S124). The coordinate calculating unit 232 outputs the calculated coordinate to the dividing and outputting unit 233. The dividing and outputting unit 233 outputs the coordinate to the rendering processing unit 217 and the communicating unit 242 (step S125).

When the communicating unit 242 acquires the coordinate output from the dividing and outputting unit 233 (step S111), the sub-processor 240 starts processing of rendering. The sub-processor 240 synchronizes attributes of an image with the rendering processing unit 217 using the synchronization control unit 243 (step S112), executes rendering (step S113), and outputs image data of a rendered image to the image input unit 212 from the image output unit 244 (step S114). Even while the rendering is performed on the basis of the coordinate acquired by the communicating unit 242, i.e., before the rendering is completed, the sub-processor 240 outputs the rendered image to the image input unit 212 at a period adjusted to a frame rate of the light modulating device 222 or a shorter period. Therefore, for example, when time equivalent to two or more frames is required until the rendering is completed, image data halfway in the rendering is output to the image input unit 212.

The rendering processing unit 217 of the main processor 211 synchronizes the synchronization control unit 243 and attributes of the image (step S126), executes the rendering on the basis of the coordinate input from the dividing and outputting unit 233 (step S127), and, after the start of the rendering, outputs the rendered image to the overlay-image retaining unit 218 at the period adjusted to the frame rate of the light modulating device 222 or the shorter period. The overlay-image retaining unit 218 outputs the image data to the superimposition processing unit 215 at the period adjusted to the frame rate of the light modulating device 222 or the shorter period. The superimposition processing unit 215 superimposes the image input from the overlay-image retaining unit 218 and the image input from the image retaining unit 214 and causes the projecting unit 220 to project a superimposed image (step S128).

The superimposition processing unit 215 stops the superimposition processing when time after the start of the superimposition processing reaches a predetermined time or when the rendered image rendered by the sub-processor 240 substantially coincides with the rendered image of the rendering processing unit 217. That is, the superimposition processing unit 215 determines whether the predetermined time elapses after the start of the superimposition processing (step S129). When the predetermined time elapses (Yes in step S129), the superimposition processing unit 215 shifts to step S131 explained below. When the predetermined time does not elapse (No in step S129), the superimposition processing unit 215 compares the image input from the image retaining unit 214 and the image input from the overlay-image retaining unit 218 and determines whether the images coincide with each other (step S130). When a difference between the rendered images exceeds a predetermined ratio (No in step S130), the operation of the projector 210 returns to step S123.

When the rendered images coincide with each other at a ratio equal to or higher than the predetermined ratio (Yes in step S130), the superimposition processing unit 215 shifts to step S131.

In step S131, the superimposition processing unit 215 stops the superimposition (overlay) processing and causes the projecting unit 220 to project only the image input from the image retaining unit 214. Thereafter, the main processor 211 determines whether the main processor 211 ends the detection of the operation by the pointer 270 (step S132). When continuing the detection of the operation (No in step S132), the main processor 211 returns to step S123. If input operation or the like for instructing the end of the operation of the pointer 270 is performed (Yes in step S132), the main processor 211 ends the processing.

As explained above, the projector 210 according to the embodiment to which the invention is applied includes the coordinate detecting unit 230 configured to calculate a coordinate of a pointed position pointed by the pointer 270, the sub-processor 240 including the rendering application 241 configured to render an image on the basis of the coordinate output by the coordinate detecting unit 230, and the main processor 211 including the superimposition processing unit 215 configured to output image data of the image rendered by the rendering application 241. The main processor 211 is configured to be capable of executing superimposition processing for performing, using the rendering processing unit 217, superimposition processing for performing, in the same manner as the rendering application 241, rendering on the basis of the coordinate calculated by the coordinate detecting unit 230, superimposing a rendered image on the image output by the rendering application 241 to generate superimposed image data, and outputting the superimposed image data. The main processor 211 executes the superimposition processing on the basis of a predetermined condition. Consequently, when any one of the sub-processor 240 and the main processor 211 performs rendering, a rendered image rendered on the basis of an input coordinate is output and projected on the screen SC2. Therefore, it is possible to reduce time until the output of the rendered image to match higher processing speed of processing speeds of the main processor 211 and the sub-processor 240.

The projector 210 includes the main processor 211 and the sub-processor 240, which are a plurality of processing devices provided independently from each other. The main processor 211 configures the coordinate detecting unit 230 and the superimposition processing unit 215. The sub-processor 240 configures the rendering application 241. Therefore, it is possible to reduce time until the display of the rendered image using an ability of any one processor having higher processing speed of the main processor 211 and the sub-processor 240.

The main processor 211 executes the superimposition processing for the predetermined time after the coordinate detecting unit 230 calculates a coordinate and the dividing and outputting unit 233 outputs the coordinate. Thereafter, the main processor 211 outputs an image without superimposing another image on the output image of the image retaining unit 214. Therefore, it is possible to minimize a frequency and an execution time of the superimposition processing.

Further, the main processor 211 stops the superimposition processing when an image same as the rendered image of the rendering processing unit 217 is included in the rendered image of the sub-processor 240 after the coordinate detecting unit 230 calculates a coordinate and the dividing and outputting unit 233 outputs the coordinate. Therefore, it is possible to minimize a frequency and an execution time of the superimposition processing.

The embodiment explained above is only an example of a specific form to which the invention is applied and does not limit the invention. The invention can be applied as a form different from the embodiment. For example, in the example explained in the embodiments, a coordinate of a pointed position is calculated by receiving infrared light emitted by the pointer 270. However, photographed image data photographed by an image pickup element that receives visible light may be processed to calculate a coordinate of a pointed position. For example, a pressure-sensitive or capacitance touch panel that detects contact operation may be arranged to calculate a coordinate of an operation position on the touch panel.

In the embodiment, as the example of the light modulating device 222 that modulates light emitted by the light source, the configuration including the three transmissive liquid crystal panels corresponding to the respective colors of RGB is explained. However, the invention is not limited to this example. For example, the light modulating device 222 may be configured by using three reflective liquid crystal panels, combining one liquid crystal panel and a color wheel, using three digital mirror devices (DMD), or combining one digital mirror device and a color wheel. When only one liquid crystal panel or DMD is used as a light modulating device, a member equivalent to a combination optical system such as a cross-dichroic prism is unnecessary. Besides the liquid crystal panel and the DMD, a light modulating device capable of modulating light emitted by the light source can be adopted without a problem.

Further, the display apparatus according to the embodiment is not limited to the projector that projects an image on the screen SC2. Various display apparatuses such as self-emitting display apparatuses including a liquid crystal monitor or a liquid crystal television that displays an image on a liquid crystal display panel, a monitor apparatus or a television receiver that displays an image on a PDP (plasma display panel), and a monitor apparatus or a television receiver that displays an image on an organic EL display panel called OLED (Organic light-emitting diode) or OEL (Organic Electro-Luminescence) are also included in the image display apparatus according to the embodiment. In this case, the liquid crystal panel, the plasma display panel, and the organic EL display panel are equivalent to the display unit.

All the functional units included in the main processor 211 and the sub-processor 240 illustrated in FIG. 6 are realized as hardware or software by the main processor 211 and the sub-processor 240. An implementation form of the functional units is not specifically limited. For example, specifically, the main processor 211 and the sub-processor 240 may be configured to realize the functional units by executing a predetermined program. For example, the main processor 211 and the sub-processor 240 may be configured as PLDs (Programmable Logic Devices) and logical blocks may be formed to correspond to the functional units shown in FIG. 6. Further, the functional units shown in FIG. 6 may be provided in the main processor 211 and the sub-processor 240 as hardware. Besides, the specific detailed configurations of the other units of the projection system 201 can be arbitrarily changed without departing from the spirit of the invention. In the configuration of the embodiment, the pointer 270 is not limited to bar-type and pen-type pointers. Further, a configuration can also be adopted in which a finger of a user is used as a pointer and the projector 210 detects a pointed position of the finger.

What is claimed is:

1. A data processing apparatus that outputs image data, the data processing apparatus comprising:
    a coordinate acquiring unit configured to acquire a plurality of input coordinates;
    a rendering unit configured to render a first image of a figure on the basis of the plurality of input coordinates acquired by the coordinate acquiring unit; and
    an output unit configured to output image data of the first image of the figure rendered by the rendering unit,
    wherein, prior to completion of the rendering of the first image of the figure by the rendering unit, the output unit is configured to
        render a second image of the figure that is substantially the same as the first image of the figure on the basis of the plurality of input coordinates acquired by the coordinate acquiring unit,
        superimpose the second image of the figure rendered by the output unit on a partial first image of the figure output by the rendering unit to generate superimposed image data, the partial first image of the figure including a portion of the first image of the figure that is less than the entire first image of the figure, and
        output the superimposed image data and execute a superimposition processing on the basis of a predetermined condition.

2. The data processing apparatus according to claim 1, wherein
    the coordinate acquiring unit and the output unit are configured by a first processing device, and
    the rendering unit is configured by a second processing device provided independently from the first processing device.

3. The data processing apparatus according to claim 1, wherein the output unit executes the superimposition processing for a predetermined time after the acquisition of the plurality of input coordinates by the coordinate acquiring unit and thereafter outputs the image data without superimposing another image on the first image of the figure rendered by the rendering unit.

4. The data processing apparatus according to claim 1, wherein the output unit executes the superimposition processing after the acquisition of the plurality of input coordinates by the coordinate acquiring unit and stops the superimposition processing when detecting that the first image of the figure rendered and output by the rendering unit is the same as the second image of the figure rendered by the output unit.

5. The data processing apparatus according to claim 1, wherein
    the data processing apparatus displays an image on the basis of image data input from an image output apparatus, and
    the data processing apparatus further comprises:
        a display unit configured to display an image;
        an input detecting unit configured to detect a position input operation to calculate a plurality of input coordinates and output the plurality of input coordinates to the image output apparatus;
        a rendering unit configured to perform rendering processing for generating an image on the basis of the plurality of input coordinates calculated by the input detecting unit; and
        a display control unit configured to superimpose the image generated by the rendering unit on the image based on the image data input from the image output apparatus and cause the display unit to display the image.

6. The data processing apparatus according to claim 5, wherein the display control unit stops, according to a predetermined condition, the superimposed display of the image generated by the rendering unit.

7. The data processing apparatus according to claim 6, wherein the display control unit stops the superimposed display when a predetermined time elapses after the superimposed display of the image generated by the rendering unit is started.

8. The data processing apparatus according to claim 6, wherein the display control unit stops the superimposed display when the image data input from the image output apparatus is image data including an image rendered on the basis of the plurality of input coordinates calculated by the input detecting unit.

9. The data processing apparatus according to claim 5, wherein
    the display unit includes a light source, a modulating unit configured to modulate light emitted by the light source, and a projecting unit configured to project the light modulated by the modulating unit on a projection surface, and
    the input detecting unit detects the position input operation on the projection surface.

10. The data processing apparatus according to claim 1, wherein:
    the figure comprises a line, and
    the plurality of input coordinates comprise points on the line.

11. The data processing apparatus according to claim 1, wherein the output unit renders the second image of the figure while the rendering unit renders the first image of the figure.

12. The data processing apparatus according to claim 1, further comprising a synchronization control unit that is configured to synchronize attributes of the first image of the figure with attributes of the second image of the figure.

13. A display apparatus comprising:
    a display unit configured to display an image;
    an input detecting unit configured to detect a position input operation to acquire a plurality of input coordinates;
    a rendering unit configured to render a first image of a figure on the basis of the plurality of input coordinates acquired by the input detecting unit;
    an output unit configured to output image data of the first image of the figure rendered by the rendering unit; and
    a display control unit configured to cause the display unit to display the image on the basis of the image data output by the output unit,
    wherein, prior to completion of the rendering of the first image of the figure by the rendering unit, the output unit is configured to render a second image of the figure that is substantially the same as the first image of the figure on the basis of the plurality of input coordinates acquired by the input detecting unit, superimpose the second image of the figure rendered by the output unit on a partial first image of the figure output by the rendering unit to generate superimposed image data, the partial first image of the figure including a portion of the first image of the figure that is less than the entire first image of the figure, and output the superimposed image data and execute a superimposition processing on the basis of a predetermined condition.

14. A method of controlling a data processing apparatus including a main processor and a sub-processor, the main processor including a coordinate acquiring unit configured to acquire a plurality of input coordinates and an output unit configured to output image data of a first image of a figure rendered by the sub-processor, and the sub-processor including a rendering unit configured to render the first image of the figure on the basis of the plurality of input coordinates acquired by the coordinate acquiring unit, the method comprising causing, according to a predetermined condition, the main processor to execute superimposition processing to render a second image of the figure that is substantially the same as the first image of the figure on the basis of the plurality of input coordinates acquired by the coordinate acquiring unit, superimposing the second image of the figure rendered by the output unit on a partial first image of the figure output by the rendering unit to generate superimposed image data, the partial first image of the figure including a portion of the first image of the figure that is less than the entire first image of the figure, and outputting the superimposed image data.

* * * * *